United States Patent

[11] 3,629,593

| [72] | Inventor | Russell H. Van Brimer<br>Chillicothe, Ohio |
|---|---|---|
| [21] | Appl. No. | 877,254 |
| [22] | Filed | Nov. 17, 1969 |
| [45] | Patented | Dec. 21, 1971 |
| [73] | Assignee | The Mead Corporation<br>Dayton, Ohio |

[54] AIR BEARING FOR OPTICAL READER
3 Claims, 2 Drawing Figs.

[52] U.S. Cl. .................................................. 250/219 DC,
271/74
[51] Int. Cl. .................................................. G01n 21/30
[50] Field of Search .......................................... 271/74, 74
A; 250/219 DC; 73/37.7; 235/61.11 E; 302/2;
308/6

[56] References Cited

UNITED STATES PATENTS

| 3,230,752 | 1/1966 | Dobson ........................ | 271/74 |
| 3,518,440 | 6/1970 | Hanson ........................ | 235/61.11 E |
| 3,523,183 | 8/1970 | Silverman..................... | 235/61.11 E |
| 3,215,819 | 11/1965 | Smith ........................... | 250/219 IDC |
| 3,411,829 | 11/1968 | Albright ....................... | 271/74 X |
| 3,422,411 | 1/1969 | Smith ........................... | 271/74 X |

Primary Examiner—James W. Lawrence
Assistant Examiner—D. C. Nelms
Attorney—Marechal, Biebel, French & Bugg ABSTRACT: In an optical reader for a noncontacting printing system in which a film transparency is conveyed between a pair of plates, one of which has a series of photosensitive devices mounted therein and the other a series of light-projecting means mounted therein, openings are formed in each plate and a fluid, such as air, is pumped through the openings to form an air cushion and prevent the film from touching either of the plates as it passes therebetween.

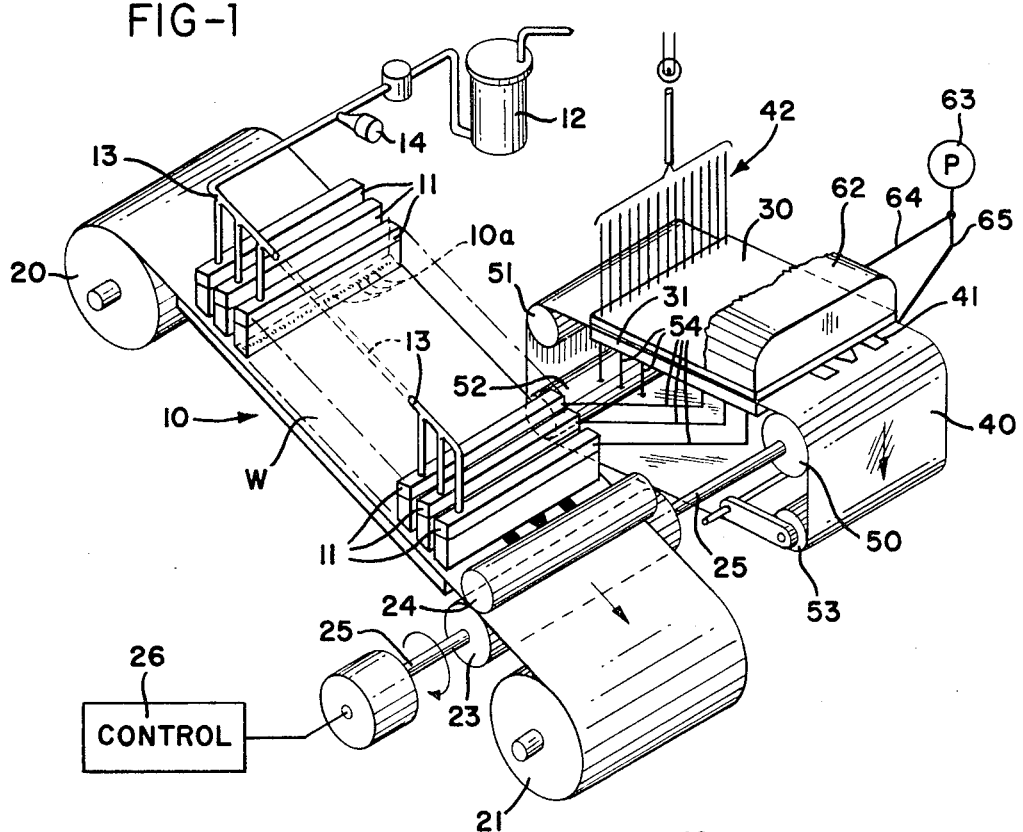
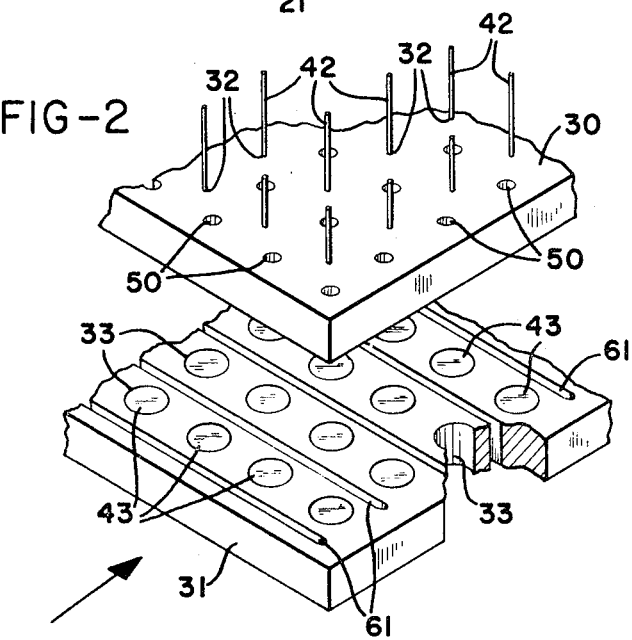
INVENTOR
RUSSELL H. VAN BRIMER
BY
Marechal, Biebel, French & Bugg
ATTORNEYS

AIR BEARING FOR OPTICAL READER

CROSS REFERENCE TO RELATED APPLICATIONS

This application is related to application Ser. No. 786,790, filed Oct. 18, 1969 for IMAGE CONSTRUCTION SYSTEM USING MULTIPLE ARRAYS OF DROP GENERATORS (Docket 4938), and Ser. No. 877,253, filed Nov. 17, 1969 for OPTICAL READER FOR WEB PRINTER (Docket 5042).

BACKGROUND OF THE INVENTION

In the above-noted applications a noncontacting printing system is disclosed in which a series of print bars, each having a series of regularly spaced orifices formed in their lower surface, are positioned in closely spaced relationship above a moving web. A printing material is supplied under pressure to each print bar so that small drops of printing material are ejected from each of the orifices. An optical reader is also disclosed for scanning a film transparency in the form of an endless belt having images thereon which it is desired to copy. The optical reader is associated with the print bars through circuitry in a manner such that the scanning of a dark area on the film by the reader causes a drop of printing material to be imprinted on a moving web at a position which corresponds to the position on the film transparency at which the dark area was scanned by the reader. The scanning function is accomplished by a series of photosensitive devices mounted in one plate and a series of fiber optics mounted in a second plate in opposition to the photosensitive devices with the film transparency passing between the two plates. It will be apparent that unless the film transparency is kept under fairly high tension it will tend to contact one or both of the plates as it passes therebetween and cause wear and possible damage to the film.

SUMMARY OF THE INVENTION

In accordance with the present invention each of the plate members is provided with a series of openings therethrough intermediate the photosensitive devices in one plate and intermediate the fiber optic openings in the other. A fluid, such as air, is then pumped through each of these openings to provide a cushion between the film transparency and the adjacent surfaces of each of the plates. In this way contact between the film and the plates is avoided even though only moderate tension is applied to the film transparency.

BRIEF DESCRIPTION OF THE DRAWINGS

FIG. 1 of the drawings is a perspective view showing, somewhat schematically, a noncontacting printing system and an optical reader therefor; and FIG. 2 is a perspective view of a portion of the plates mounting the optic fibers and photosensitive devices showing the means for providing air cushions between each of the plates and the film.

DESCRIPTION OF THE PREFERRED EMBODIMENTS

FIG. 1 of the drawings shows a noncontacting printing system 10 comprising a plurality of print bars 11 each having a series of orifices 10a formed in their lower surface for projecting drops of printing material toward a moving web W. Printing material from a central supply system 12 is pumped through a manifold 13 to each of the print bars. While only a portion of the print bars are shown in FIG. 1, it will be apparent, as indicated by the phantom lines, that a plurality of print bars are positioned in closely spaced relationship to each other throughout the extend of the printing area. It will also be apparent that although orifices 10a are sown in only one print bar, each of the bars is provided with orifices.

A vibrator device 14 is attached to the printing material supply line to impose a high-frequency vibration on the system to insure that the drops ejected from the print bars are of uniform size and spaced from each other at uniform intervals. A feed roller 20 and a takeup roller 21 are provided for the web W and the speed of the web is controlled by the drive rolls 23 and 24 powered through the shaft 25 by means of the control mechanism 26.

An optical scanner, consisting of a pair of plate members 30 and 31 is provided with each of the plates having a series of apertures 32 and 33, respectively formed therein at positions corresponding to the positions of the orifices in the print bars 11. The plates 30 and 31 are positioned in closely spaced relationship with just sufficient clearance between them to allow a transparency 40 in the form of an endless belt and having a master image 41 imprinted thereon, to pass between the plates, and in each of the apertures 32 in the plate 30 an optic fiber 42 is positioned to direct a discrete beam of light towards a photosensitive device 43 mounted in the lower plate 31.

The shaft 25 for the drive roll 23 extends to and has mounted thereon a roll 50 of the same diameter as the roller 23. Positioned in spaced parallel relationship to the roller 50 is a roller 51, and the peripheries of the rollers 50 and 51 are positioned such that the transparency 40 may extend tangent to the rollers and between the plates 30 and 31. A turning roller 52 and a tension roller 53 may also be provided to permit the film transparency to be conveyed between the two plates and scanned by the optic fibers and phototransistors.

With the system thus far described sensing of a light area, as at 41, on the film transparency will cause a signal to be generated to the print bars 11 through the lines 54, only a few of which are shown for purpose of illustration in FIG. 1. This in turn will cause a drop of ink passing from the print bar at that exact instant to receive a charge so that as the ink drop subsequently passes through an electrostatic field set up between the print bar and the web W the drops will be deflected into a catcher (not shown). Sensing of a dark area on the film results in no signal being generated and hence, a drop passing from the print bar at that instant is imprinted on the web. Thus, the image scanned by the optical reader is repeated on the web W as described in greater detail in the above noted related applications.

With reference to FIG. 2 of the drawings, it will be seen that the plates 30 and 31 are each provided with a series of openings therethrough intermediate the optic fibers and phototransistors. Thus the plate 30 is provided with a series of openings 60 therethrough while the plate 31 is provided with a series of slots 61 positioned intermediate the phototransistors. A plenum 62, a portion of which is shown in FIG. 1, is mounted above the plate 30 and is supplied with a pressurized fluid, such as air, by the pump 63 feeding the plenum through the line 64, and in a similar manner the slots 61 may also be provided with a pressurized fluid through the line 65.

In operation, air is pumped through these openings to form an air bearing between each of the plate surfaces and the adjacent surfaces of the film 40 so that a film transparency passing between the plates in the direction indicated by the arrow is maintained out of contact with the plates. While the openings are shown as holes and slots positioned intermediate the optic fibers and the rows of phototransistors, respectively, it will be apparent that the size and shape of the openings may be varied as necessary to obtain the desired results.

From the above, it will be apparent that the present invention provides a system for preventing contact between the opposing plates of an optical reader and the film transparency passing therebetween.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An optical reader for a noncontacting printing system comprising:
   a. a pair of plate members extending in spaced parallel relationship to each other,
   b. a first roller positioned adjacent one end of said plate members, c. a second roller positioned in spaced parallel relationship to said first roller adjacent another end of said plate members opposite said one end,
d. roller means cooperating with said first and second rollers for supporting an endless belt under tension,
e. said first and second rollers being positioned relative to each other and to said plate members such that a reach of said endless belt extends tangent to the peripheries of said first and second rollers between said spaced parallel plate members,
f. a series of photosensitive devices mounted in one of said plate members,
g. a corresponding series of light-projecting means mounted in the other of said plate members to direct discrete beams of light toward said photosensitive devices,
h. means defining a series of openings in each of said plate members intermediate said photosensitive devices and said light-projecting means, and
i. means for directing a gaseous fluid under pressure through each of said openings toward the plate member opposite thereof.

2. The apparatus of claim 1 further comprising:
a. means associated with one of said rollers for synchronizing the speed thereof with a third roller spaced from said optical reader.

3. The apparatus of claim 2 wherein:
a. said light-projecting means comprises a series of optic fibers,
b. one end of each of said optic fibers being positioned opposite one of said photosensitive devices, and
c. the other end of each of said fibers being positioned opposite a light source.

* * * * *